3,065,454
SELECTIVE MIXING OF SEISMIC SIGNALS
Armistead M. Moore, Houston, Tex., assignor, by mesne assignments, to Jersey Production Research Company, Tulsa, Okla., a corporation of Delaware
Filed Dec. 24, 1959, Ser. No. 861,807
4 Claims. (Cl. 340—15.5)

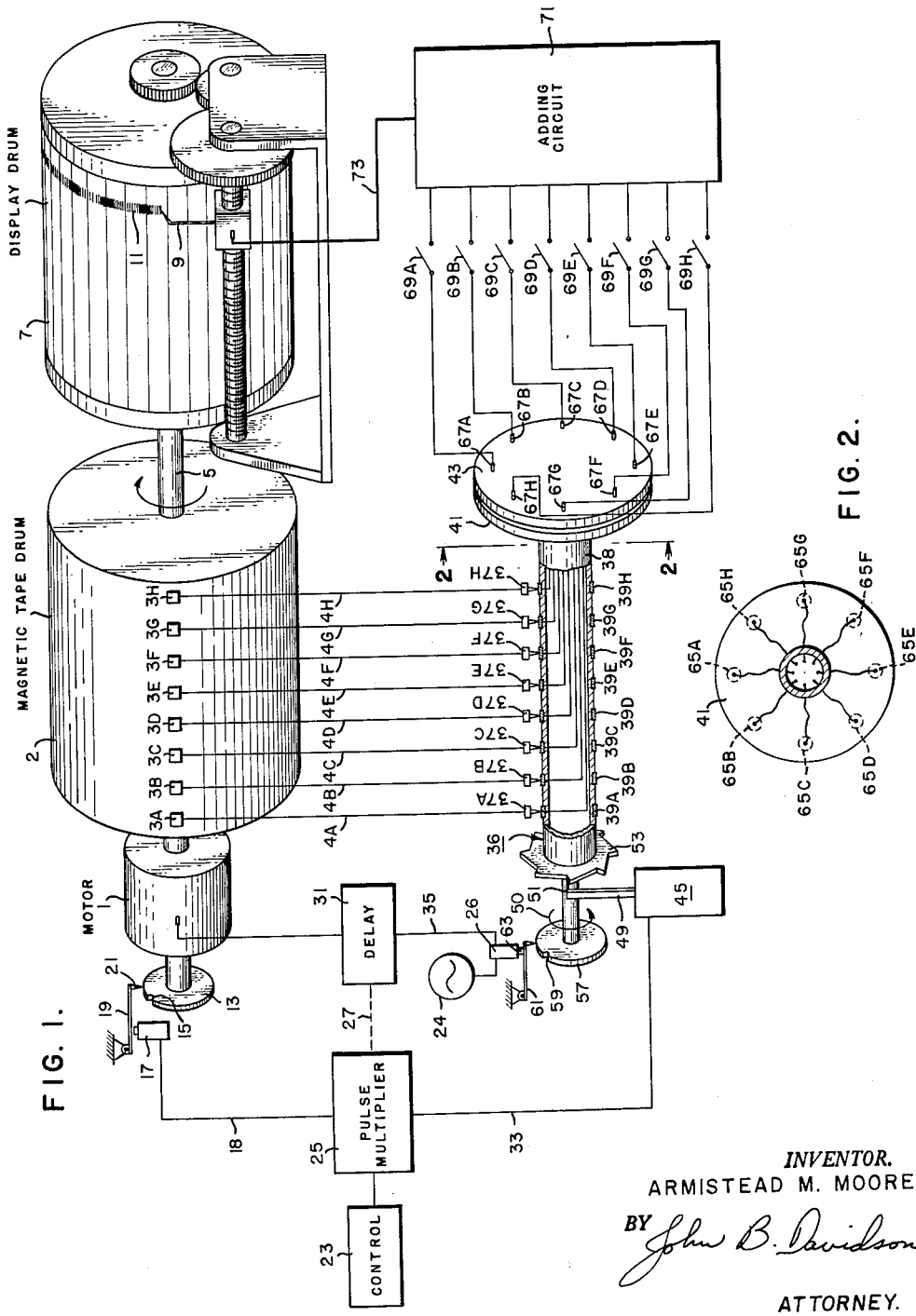

This invention relates to seismic exploration, and more particularly to the selective compositing of traces of a seismogram in order to more clearly distinguish significant events on the seismogram.

In the past many expedients have been used to facilitate interpretations of seismic records. A method that has been found to be particularly helpful is the compositing of adjacent traces on the seismogram in order to eliminate events having random time and amplitude distribution. Recently, it has been found particularly desirable to composite not only adjacent traces but also traces in various combinations. The reason for this development is that, as a result of improved types of seismic presentation, it has been learned that not all events on a seismic record that interfere with desired events are characterized by random time and amplitude distribution. The interfering events may be regular and correlatable; in this regard, events produced by refracted waves have been found to be particularly troublesome.

It has been found that by combining non-adjacent traces in given combination across a seismogram, such regular or coherent interfering events are substantially eliminated from the resulting record and that desired events often become visible for the first time. In a specific instance, a 96 trace variable density type seismogram was operated on by combining the first, third, seventh, and ninth traces to form a first composite trace, combining the second, fourth, eighth, and tenth traces to form a second composite trace, combining the third, fifth, ninth, and eleventh traces to form a third composite trace, and continuing this process across the 96 trace original record. On the composited seismogram thus formed, desired events stood out clearly that were discernible only with great difficulty on the original seismogram, and obscuring events were substantially eliminated.

In accordance with one aspect of the present invention, means are provided for simultaneously reproducing the traces of the seismogram as a plurality of electrical signals which are individually applied to a plurality of electrical leads. The electrical leads are individually connected to a plurality of contacts on a rototable disk that is disposed in face-to-face relationship with a fixed disk. The fixed disk has a plurality of matching contacts; the contacts on each disk are circularly disposed in equal angular spaced relationship about the facing surfaces of the disk so as to be brought into successive contact by rotation of the rotatable disk. Stepping apparatus is provided that is adapted to rotate the rotatable disk through a predetermined integral multiple of the angle between the adjacent contacts on the rotatable disk at the conclusion of a reproduction cycle of the electrical signals. The contacts of the fixed disk are coupled to input circuits of an adding circuit through a plurality of individually closable switches. By closing predetermined sets of the switches, and by repetitively reproducing the seismic signals, the apparatus is adapted to combine the seismic signals according to a predetermined pattern and to step the pattern across the seismogram so that the ultimate result is a secondary seismogram whereon both undesired regular events and undesired events having random time and amplitude distribution are eliminated from the seismogram.

The various objects and advantages of the present invention may be more completely understood by referring to the following description taken in connection with the accompanying drawings, wherein:

FIG. 1 diagrammatically illustrates an embodiment of the invention, and

FIG. 2 is a sectional view taken along the line 2—2 of FIG. 1 showing the electrical connections on the back face of the rotatable disk.

The invention is suitable for use in connection with the conventional type of seismic exploration wherein a seismic impulse is initiated by exploding a charge of dynamite in the earth, preferably below the weathered layer, and the resulting seismic waves are detected by means of a plurality of geophones disposed more or less on a straight line in the field of movement of the artificial seismic impulse. The invention is particularly adapted for use with the weight-dropping technique described in U.S. Patent No. 2,851,121—McCollum, wherein seismic impulses are initiated by dropping a heavy weight on the ground at a multiplicity of points along the line between the seismic wave detecting locations. The detected seismic waves are recorded as in reproducible traces, usually on magnetic tape. At a later time the traces are reproduced in side-by-side relationship in visible form. Preferably, the visible seismogram thus produced is in the form of a multiplicity of variable density traces on electro-sensitive paper, the density of each trace being indicative of the amplitude of the seismic signal corresponding thereto.

In connection with the apparatus illustrated in FIG. 1, it is assumed that a seismogram has been recorded on magnetic tape using one of the seismic observation techniques described above. The magnetic tape is fastened to a magnetic tape transport drum 2 in the usual manner. Magnetic tape transport drum 2 is connected to a common shaft 5 along with a visual display transport drum 7 onto which electrosensitive paper may be fastened. Connected to the same shaft are a drive motor 1 and a switch actuating cam 13.

Operatively associated with the magnetic tape transport drum 2 is a bank of magnetic trace detecting and reproducing heads designated by the reference numerals 3A through 3H. The function of the reproducing heads is to produce on electrical leads 4A through 4H seismic signals which correspond to the original output signals of seismic detectors utilized in the initial recording on the magnetic tape carried by drum 2. In the relatively simple system illustrated in FIG. 1, it is assumed that only eight traces have been recorded on the magnetic tape. In practice, a far greater number of signals will be recorded; for example, in connection with a conventional seismic observation utilizing the weight-dropping technique, as many as 96 traces have been recorded for use with the system described herein. However, in order to avoid unnecessarily cluttering the drawing and to facilitate understanding of the invention, it is necessary to limit the number of traces assumed to have been made in connection with a seismic observation.

The output signals from the reproducing heads 3A through 3H are transmitted on electrical leads 4A through 4H to a stepping switch 36. The stepping switch comprises a fixed plate or disk 43 and a rotatable plate or disk 41 in face-to-face, close-spaced relationship, a shaft 38 connected to the disk 41 for rotation thereof, a ratchet wheel or gear 53 connected to the shaft, a solenoid-actuated pawl 51 for engaging the gear 53 to rotate the shaft, an actuating arm 49 for the pawl, and a solenoid 45 for reciprocally moving the actuating arm 49 responsive to electrical impulses communicated thereto. A cam 57 is connected to the shaft for controlling motor 1 in the manner set forth below.

Disks 41 and 43 are formed of an electrically non-conductive material such as Plexiglas Lucite. They carry a multiplicity of contacts disposed in matching circles of equal radius on the disks. The contacts on disk 41 are designated by the reference numerals 65A through 65H (see FIG. 2), and the contacts on disk 43 are designated by the reference numerals 67A through 67H. The contacts are shown in FIG. 1 as extending into the back side of disk 43. The contacts extend all the way through the disk so as to engage the contacts on disk 41. The contacts on both disks are equiangularly spaced on circles of equal radius so that when disk 41 is repetitively rotated through the angle between the contacts, each contact will successively engage the contacts on disk 43. Manifestly, disk 41 is rotated on an axis passing through the center of the circle on which the contacts thereon are disposed.

Contacts 65A through 65H are respectively connected to electrical leads 4A through 4H through slip rings designated by reference numerals 39A through 39H which engage contacts 37A through 37H, which in turn are electrically connected through electrical leads 4A through 4H, respectively. Thus, lead 4A is in contact with contact member 65A, lead 4B is in contact with contact member 65B, etc.

Ratchet wheel 53, pawl 51, and solenoid 45 are adapted to rotate shaft 38 through an angle equal to the angle between contacts on disk 41 with each energization of solenoid 45. Actuating arm 49 may be normally extended so that solenoid 45 will pull the actuating arm and pawl downwardly as viewed in FIG. 1 to rotate the shaft in the direction shown by arrow 50.

Contacts 67A to 67H are electrically connected to the input circuits of adding circuit 71 through switches 69A to 69H, respectively. These switches may be single pole-single throw switches and are individually closed so that electrical signals appearing at the contacts 67A through 67H may be selectively coupled to adding circuit 71 in any grouping in accordance with the desires of the operator. Adding circuit 71 is adapted to add together the electrical signals coupled thereto so as to derive a single output signal indicative of the sum of the signals appearing at the input circuits thereof. The output signal appearing on electrical lead 73 is applied to recording head or stylus 9 so as to produce a variable density trace 11 on the electrosensitive paper carried by display drum 7.

Display drum 7 may be of the type that records a continuous spiral trace. The effect produced by successively recording a plurality of signals in spiral trace with the initiation of the recordings of each signal laterally in line will be the same as the effect obtained by individually recording a number of separate traces in side-by-side relationship. Recording head 9 may be mounted on a helically threaded shaft driven through a reduction gear connected to shaft 5.

Stepping switch 36 is actuated at the end of each revolution of magnetic tape drum 2 to rotate disk 41 through a multiple of the angles between contacts thereon. Each pulse applied to solenoid 45 turns shaft 38 through the angle between contacts on disk 41. Therefore, in order to turn the shaft through a multiple greater than one of this angle, it is necessary only to apply the desired number of electrical pulses to solenoid 45. This operation is effected by generating a pulse with switch 17 from an electrical source within pulse multiplier 25, applying the pulse to the pulse multiplier 25 and controlling the number of pulses on the output line 33 from the pulse multiplier 25 by means of pulse multiplier controlling device 23. Switch 17 is actuated by means of a spring-biased actuating arm 19 having a prong 21 at one end thereof and pivoted at the other end thereof. The prong 24 slips into a notch 15 at the end of each revolution of drum 2 to actuate switch 17. Switch 17 is connected to the pulse multiplier and the electrical sources therein by means of line 18. The pulse multiplier 25 and the control 23 therefor may be combined in a conventional device using telephone type stepping switches, such as is manufactured by the Clare Relay Company of Chicago, Illinois. A suitable circuit for pulse multiplier 25 and control 23 is illustrated on page 8 of Technical Bulletin 473, "Rotary Stepping Switches," published by Automatic Electric Company of Northlake, Illinois (1959).

The constant speed motor 1 is energized from a power source 24 through relay 26 and delay device 31. Delay device 31 is actuated by a mechanical connection 27 from pulse multiplier 25 and is connected to power source 24 through an electrical connection 35 and relay 26. Relay 26 is actuated by an actuating plunger 63 at the end of each complete revolution of shaft 36. The delay device 31 may be a conventional, normally-closed timing switch adapted to open for a predetermined length of time after reception of a signal from pulse multiplier 25, such as is described in Bulletin SD-1R of the Aga Division of the Elastic Stop Nut Corporation of America, Princeton, New Jersey (1953). Delay device 31 also may be a known type of switch and relay assembly, adapted to open a circuit when pulse multiplier 25 is energized and to close the circuit when pulse multiplier 25 produces its last output pulse. Pulse multiplier 25 transmits an actuating signal to delay device 31 when a pulse is received from switch 17 so that the motor 1 is immediately stopped. The reason for inserting the delay device in the power circuit for motor 1 is to permit the pulse multiplier 25 to turn shaft 36 and disk 41 through the required angle. Inasmuch as shaft 36 and disk 41 have a considerable amount of inertia, a time interval of between .05 second and .01 second is required for each stepping operation. Delay device 31 also may be an electronic device such as is well known to prior art.

The operation of the apparatus described above is as follows. Let it be assumed that time delay device 31 and relay 26 have been closed to energize motor 1 from source 24. Motor 1 will drive the magnetic drum through one revolution. During this revolution, electrical signals will be produced by reproducing heads 3A through 3H and transmitted through the stepping switch to the adding circuit. Let it be assumed further that predetermined ones of switches 69A to 69H have been closed. Assuming, for example, that switches 69A, 69C, and 69E are closed, only the signals appearing on lines 4A, 4C, and 4E will be coupled to adding circuit 71. Adding circuit 71 will add together the electrical signals coupled thereto and will apply them to recording stylus 9 so that a variable density record trace is burned on to the electrosensitive paper carried by display drum 7. At the end of the revolution, prong 21 will slip into recess 15 so that actuating arm 19 will actuate switch 17. A pulse will be produced on line 18 which will be transmitted to delay device 31 to open the circuit from relay 26. Pulse multiplier 25 will produce one or more pulses in accordance with the setting of the control device 23. The pulses will be transmitted to solenoid 45 to turn shaft 38 through a predetermined multiple of the angle between adjacent contacts on disk 41. Assuming that the control device 23 has been set so that pulse multiplier will produce two pulses, contacts 65A, 65C, and 65E, respectively, will now be in contact with contacts 67C, 67E, and 67G, respectively. After time delay device 31 has timed out, delay device 31 will again be closed to energize motor 1 until another revolution of the drum has been completed. Another pulse will be produced on line 18 which will be effective to actuate the stepping switch so that contacts 65A, 65C, and 65E, respectively, will now be in contact with contacts 67E, 67G, and 67A, respectively. The cycle will be repeated two more times until switch 63 is actuated when the prong at the end of actuating arm 61 engages the notch 59 in cam 57. This will disconnect source 24 from motor 1 to stop the motor.

An actual apparatus that has been built in accordance with the principles described above utilizes magnetic tape on which 96 seismic traces have been recorded. The pulse multiplier used with this apparatus can produce from 1 to 12 pulses responsive to each pulse fed into the input circuit thereof. Thus, the stepping switch is adapted to step through an angle which may be up to twelve times the angle between adjacent contacts on the disk 41. By closing appropriate groups of switches 69, almost any combination of traces can be composited. Usually, it is not particularly effective to composite more than ten traces at a time.

The invention is not necessarily to be restricted to the specific structural details, arrangement of parts, or circuit connections herein set forth, as various modifications thereof may be effected without departing from the spirit and scope of the invention.

What is claimed is:

1. Apparatus for compositing selected traces of a reproducible seismogram formed from a plurality of electrical signals indicative of earth movement in the field of movement of one or more artificial seismic impulses, comprising: first means including a plurality of electrical leads for simultaneously and repetitively reproducing the electrical signals on said plurality of electrical leads with a time delay between reproduction cycles; a fixed disk and a rotatable disk positioned in face-to-face close spaced relationship, each disk having a plurality of electrical contacts equal in number to the number of said electrical leads and circularly disposed in equiangular spaced relationship about the facing surfaces of the disks so as to be brought into successive contact by rotation of said rotatable disk; a shaft coaxially connected to said rotatable disk for rotation of movement of said rotatable disk around the center of circle defined by the circularly disposed contacts on said rotatable disk; a plurality of slip rings longitudinally disposed along said shaft and equal in number to said electrical leads, and individually connected to individual ones of said contacts on said rotatable disk; pulse producing means operatively associated with said first means for producing an electrical pulse at the end of each reproduction cycle of said electrical signals; pulse multiplying means connected to said pulse producing means adapted to produce a predetermined number of pulses responsive to each pulse produced by said pulse producing means; stepping means electrically connected to said pulse multiplying means and operatively connected to said shaft, adapted to angularly rotate said shaft and said rotatable disk through an angle equal to the angle between adjacent contacts on said rotatable disk responsive to each pulse produced by said pulse multiplying means; an adding circuit having a plurality of input circuits at least equal in number to the number of said electrical leads, and an output circuit, said adding circuit being adapted to produce an electrical signal indicative of the sum of the electrical signals appearing at said input circuits; a plurality of individually closable switches individually connecting the contacts on said fixed disk to individual ones of said input circuits; and recording means connected to said output circuit for recording in visible form the output signals of said adding circuit.

2. Apparatus for compositing selected traces of a reproducible seismogram formed from a plurality of electrical signals indicative of earth movement in the field of movement of one or more artificial seismic impulses, comprising: first means including a plurality of electrical leads for simultaneously and repetitively reproducing the electrical signals on said plurality of electrical leads with a time delay between reproduction cycles; a fixed disk and a rotatable disk positioned in face-to-face close spaced relationship, each disk having a plurality of electrical contacts equal in number to the number of said electrical leads and circularly disposed in equiangular spaced relationship about the facing surfaces of the disks so as to be brought into successive contact by rotation of said rotatable disk; electrical connecting means individually connecting said electrical leads to individual ones of said electrical contacts on said rotatable disk; pulse producing means operatively associated with said first means for producing an electrical pulse at the end of each reproduction cycle of said electrical signals; pulse multiplying means connected to said pulse producing means adapted to produce a predetermined number of pulses responsive to each pulse produced by said pulse producing means; stepping means electrically connected to said pulse multiplying means and operatively connected to said rotatable disk to angularly rotate said rotatable disk through an angle equal to the angle between adjacent contacts on said rotatable disk responsive to each pulse produced by said pulse multiplying means; an adding circuit having a plurality of input circuits at least equal in number to the number of said electrical leads, and an output circuit, said adding circuit being adapted to produce an electrical signal indicative of the sum of the electrical signals appearing at said input circuits; a plurality of individually closable switches individually connecting the contacts on said fixed disk to individual ones of said input circuits; and recording means connected to said output circuit for recording in visible form the output signals of said adding circuit.

3. Apparatus for compositing selected traces of a reproducible seismogram formed from a plurality of electrical signals indicative of earth movement in the field of movement of one or more artificial seismic impulses, comprising: first means including a plurality of electrical leads for simultaneously and repetitively reproducing the electrical signals on said plurality of electrical leads with a time delay between reproduction cycles; a fixed disk and a rotatable disk positioned in face-to-face close spaced relationship, each disk having a plurality of electrical contacts equal in number to the number of said electrical leads and circularly disposed in equi-angular spaced relationship about the facing surfaces of the disks so as to be brought into successive contact by rotation of said rotatable disk; electrical connecting means individually connecting said electrical leads to individual ones of said electrical contacts on said rotatable disk; pulse producing means for producing a predetermined number of electrical pulses at the end of each reproduction cycle of said electrical signals; stepping means electrically connected to said pulse multiplying means and operatively connected to said rotatable disk to angularly rotate said rotatable disk through an angle equal to the angle between adjacent contacts on said rotatable disk responsive to each pulse produced by said pulse multiplying means; an adding circuit having a plurality of input circuits at least equal in number to the number of said electrical leads, and an output circuit, said adding circuit being adapted to produce an electrical signal indicative of the sum of the electrical signals appearing at said input circuits; a plurality of individually closable switches individually connecting the contacts on said fixed disk to individual ones of said input circuits; and recording means connected to said output circuit for recording in visible form the output signals of said adding circuit.

4. Apparatus for compositing selected traces of a reproducible seismogram formed from a plurality of electrical signals indicative of earth movement in the field of movement of one or more artificial seismic impulses, comprising: first means including a plurality of electrical leads for simultaneously and repetitively reproducing the electrical signals on said plurality of electrical leads with a time delay between reproduction cycles; a fixed disk and a rotatable disk positioned in face-to-face close spaced relationship, each disk having a plurality of electrical contacts equal in number to the number of said electrical leads and circularly disposed in equi-angular spaced relationship about the facing surfaces of the disks so as to be brought into successive contact by rotation of said rotatable disk; second means connected to said first means and to said rotatable disk, adapted to rotate said rotatable disk through a predetermined integral multiple of the angle between adjacent contacts on said rotatable disk at the end of each reproduction cycle of said electrical signals; an adding circuit having a plurality of input circuits at least equal in number to the number of said electrical leads, and an output circuit, said adding circuit being adapted to produce an electrical signal indicative of the sum of the electrical signals appearing at said input circuits; a plurality of individually closable switches individually connecting the contacts on said fixed disk to individual ones of said input circuits; and recording means connected to said output circuit for recording in visible form the output signals of said adding circuit.

References Cited in the file of this patent

UNITED STATES PATENTS

| | | |
|---|---|---|
| 2,794,966 | McCarty | June 4, 1957 |
| 2,876,428 | Skelton et al. | Mar. 3, 1959 |